(12) United States Patent
Ichihara

(10) Patent No.: US 6,447,702 B1
(45) Date of Patent: Sep. 10, 2002

(54) SOFT TIRE MANUFACTURING PROCESS

(75) Inventor: Michihiro Ichihara, Kanzaki-gun (JP)

(73) Assignee: Maruichi Advantec Co., Ltd. (JP)

( * ) Notice: Subject to any disclaimer, the term of this patent is extended or adjusted under 35 U.S.C. 154(b) by 0 days.

(21) Appl. No.: 09/483,518

(22) Filed: Jan. 14, 2000

Related U.S. Application Data

(63) Continuation of application No. 09/028,020, filed on Feb. 23, 1998, now abandoned.

(30) Foreign Application Priority Data

Dec. 26, 1997 (JP) .............................................. 9-360508

(51) Int. Cl.[7] .......................... B29C 44/06; B29C 44/12
(52) U.S. Cl. .................... 264/46.9; 264/45.5; 264/46.4; 264/48; 264/135
(58) Field of Search .......................... 264/46.9, 48, 255, 264/46.4, 45.5, 46.7, 135

(56) References Cited

U.S. PATENT DOCUMENTS

| | | | | |
|---|---|---|---|---|
| 3,730,244 A | * | 5/1973 | Ross .......................... | 152/323 |
| 4,470,785 A | * | 9/1984 | Koorevaar ................. | 264/46.9 |
| 4,588,542 A | * | 5/1986 | Pierce ....................... | 264/45.5 |
| 5,776,991 A | * | 7/1998 | Teratani ..................... | 264/48 |

* cited by examiner

*Primary Examiner*—Allan R. Kuhns
(74) *Attorney, Agent, or Firm*—Gabriel P. Katona L.L.

(57) ABSTRACT

Accordingly, the present invention is a soft tire assembly of a thick elastic layer of a foamed elastomer having an outer peripheral surface and cells in the foamed layer that are open to the exterior through the outer peripheral surface, or a mixture of cells open to the exterior and closed cells, wherein the expansion ratio of the foamed elastomer is from 1.5 to 6.0, and the elastomer has a specific gravity of from 0.5 to 2.0. The layer is mounted on a wheel rim, suitably of a metal, having an outer peripheral surface coated with a resin, and the foamed elastic layer is attached onto and about the outer peripheral surface of the wheel rim. The soft tire assembly is made by depositing a coating resin over the outer surface of a wheel rim, inserting the coated wheel rim into a casting and foaming mold, filling and foaming an expandable elastomer in a space within said mold between its inner peripheral surface and the outer surface of the wheel rim to form a thick elastic layer of foamed elastomer with a flat outer surface integrally with the wheel rim, the foamed layer having an expansion ratio of from 1.5 to 6, and removing an outer skin formed on at least the flat outer peripheral surface whereby foamed cells within said thick foamed elastic layer become exposed through the exterior through the outer peripheral surface of the layer.

1 Claim, 5 Drawing Sheets

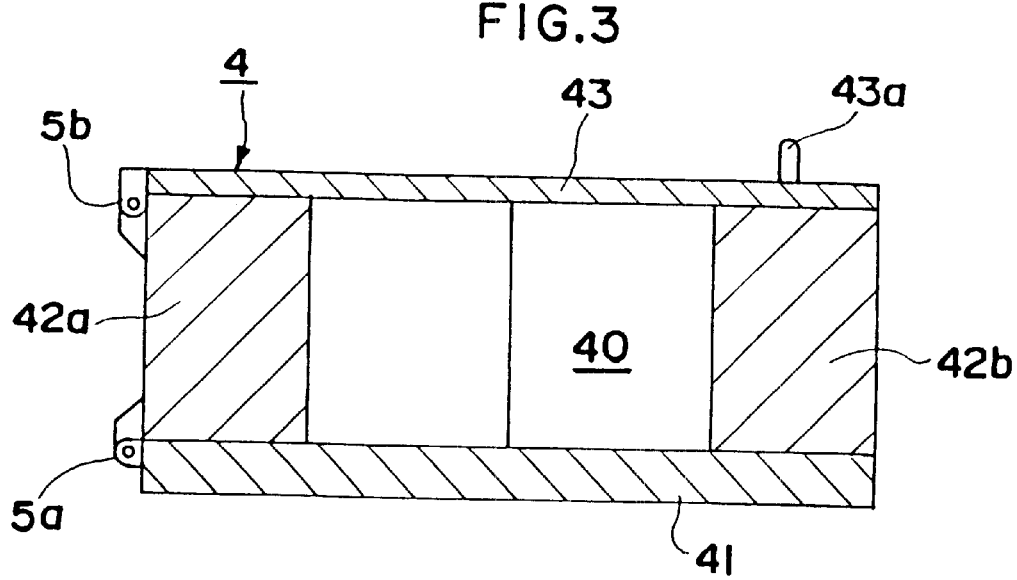
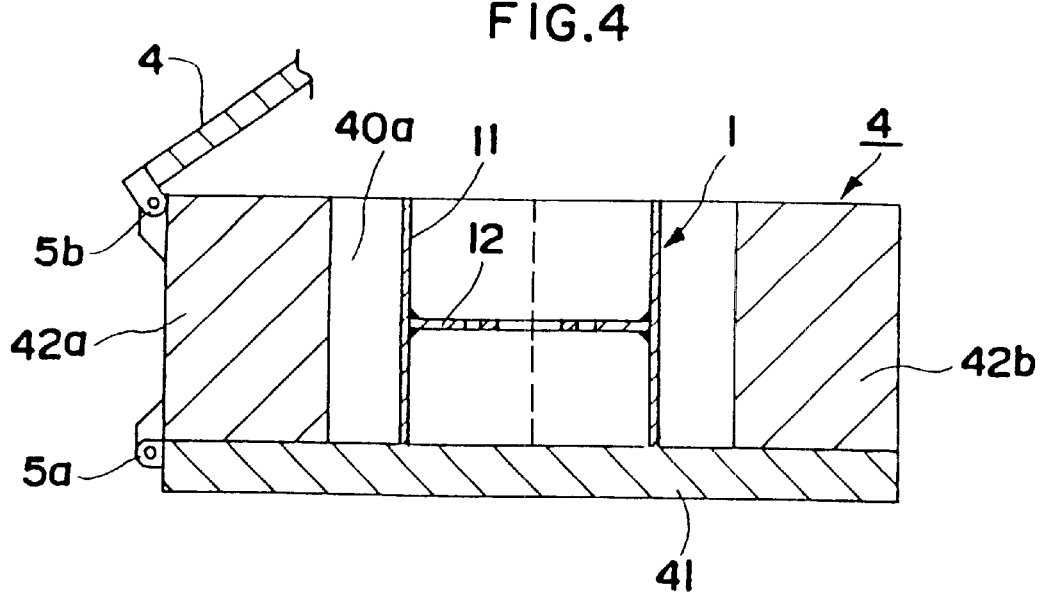

SOFT TIRE MANUFACTURING PROCESS

This application is a continuation of application Ser. No. 09/028,020, filed Feb. 23, 1998, now abandoned.

FIELD OF THE INVENTION

The present invention relates to a soft tire which enables travel on soft ground, such as a sward of a golf course or the like, without forming ruts, a manufacturing process of the soft tire and a vehicle having such soft tires.

BACKGROUND

Various self propelled vehicles traverse soft surfaces, such as golf carts, golf course maintenance vehicles, sweepers such as for removing dust and debris, soil fillers, sand fillers, lawn mowers, aerators, and the like. In conventional self-propelled vehicles with high tread pressure of the tire, ruts can be formed due to sinking of the tire upon traveling on the soft ground surface. Such ruts can interfere with the use of the surface, such as playing golf in the ruts. Therefore, for example, golf carts are required to travel on a path apart from the sward. In case of the other self-propelling vehicles operating on the sward, the rear wheel is often formed into a single elongated roll form to stamp out the ruts formed by the front wheels. Also, the vehicle is driven steered reciprocally with small intervals for overlapping both sides of the rut formed by the rear wheel to remove the rut.

Thus, in the conventional golf course, it is inconvenient to drive the golf carts over the sward. Since a dedicated cart path is required, this represents an imposition on designing the golf course, or limiting the area available for the golf course. Other self propelled vehicles can be steered reciprocally on the sward for operation, mobility such as for changing direction, is low for the elongated single roll form rear wheel and this makes its efficiency quite low for various tasks.

There was described in Unexamined Japanese Patent Publication (Kokai) No. Heisei 8-58308 a soft tire having a flat surface, which is formed by fixing a particular hardness of thick cylindrical soft elastic body, such as a foamed polyurethane or the like, onto the outer peripheral surface of a wheel rim, and a vehicle with such soft tire. Upon traveling on a soft ground surface with this soft tire, such as the sward surface when weights of a vehicular body and of the occupants is loaded, the soft elastic tire body causes elastic deformation to widen the tread surface width, the tread pressure becomes low and this prevents sinking of the tire into the soft ground surface and thus avoids formation of a rut.

The soft tire of the above-identified publication provides a feature by which formation of a rut can be avoided. However, during the process of repeated actual traveling tests, it has been found that there is room to improve in the durability and mobility of the loaded vehicle. There is also a further opportunity to lower manufacturing costs.

During vehicle travel with the soft tires, elastic deformation of compression and expansion of the elastic tire body repeatedly occurs per each rotation of the tire. Furthermore, the rotational force of the driving wheels is transmitted to the ground surface by the elastic layer, and in the driven tires the wheels are rotated by a frictional resistance between the elastic tire body layer and the ground surface. In these cases, mutually opposite tensile forces act on the inner periphery and the outer periphery of the elastic tire body to cause elastic deformation in the peripheral direction constantly applying a force tending to peel off the contacting interface between the wheel and the elastic tire body layer. Therefore, the soft tire of the above-identified publication tends to lower the restoring ability from the deformed condition thus to easily cause peeling off at the contact interface to result in insufficient tire durability.

In the soft tire of the foregoing publication, in order to increase fixing strength of the contacting interface, a tire unit, in which collar portions are provided on both peripheral edges of the narrow wheel, is produced to combine a plurality of tire units on the wheel portion to form a wide soft tire. Therefore, assembly is quite cumbersome and increases the manufacturing costs. Since a wide tire width is required to reduce the tread pressure not to form a rut, mobility, such as changing of direction, etc., of the vehicle can become degraded.

BRIEF DESCRIPTION OF THE INVENTION

It is an object of the present invention to eliminate the drawbacks of the prior art. Thus, it is an object of the present invention to provide a soft tire which can travel on the soft ground surface, such as a sward surface, without forming ruts, and can be produced easily and at low cost, with satisfactory durability, a manufacturing method therefor, and a vehicle adapted to travel on a soft ground surface, such as sward surface, with a lifting of the tire and requiring less maintenance.

Accordingly, the present invention is a soft tire assembly of a thick elastic layer of a foamed elastomer having an outer peripheral surface and cells in the foamed layer that are open to the exterior through the outer peripheral surface, or a mixture of cells open to the exterior and closed cells, wherein the expansion ratio of the foamed elastomer is from 1.5 to 6.0, and the elastomer has a specific gravity of from 0.5 to 2.0. The layer is mounted on a wheel rim, suitably of a metal, having an outer peripheral surface coated with a resin, and the foamed elastic layer is attached onto and about the outer peripheral surface of the wheel rim.

The soft tire assembly of the present invention is made by depositing a coating resin over the outer surface of a wheel rim, inserting the coated wheel rim into a casting and foaming mold, filling and foaming an expandable elastomer in a space within said mold between its inner peripheral surface and the outer surface of the wheel rim to form a thick elastic layer of foamed elastomer with a flat outer surface integrally with the wheel rim, the foamed layer having an expansion ratio of from 1.5 to 6, and removing an outer skin formed on at least the flat outer peripheral surface whereby foamed cells within said thick foamed elastic layer become exposed through the exterior through the outer peripheral surface of the layer.

BRIEF DESCRIPTION OF THE DRAWINGS

The present invention will be understood more fully from the detailed description given herebelow and from the accompanying drawings, wherein

FIG. 3 is a longitudinal cross-sectional view of a casting and foaming mold for mold casting of a thick elastic layer of the soft tire of FIG. 1;

FIG. 4 is a longitudinal cross-sectional view as in FIG. 3, but with a wheel rim within the mold;

DETAILED DESCRIPTION

Figure 1:
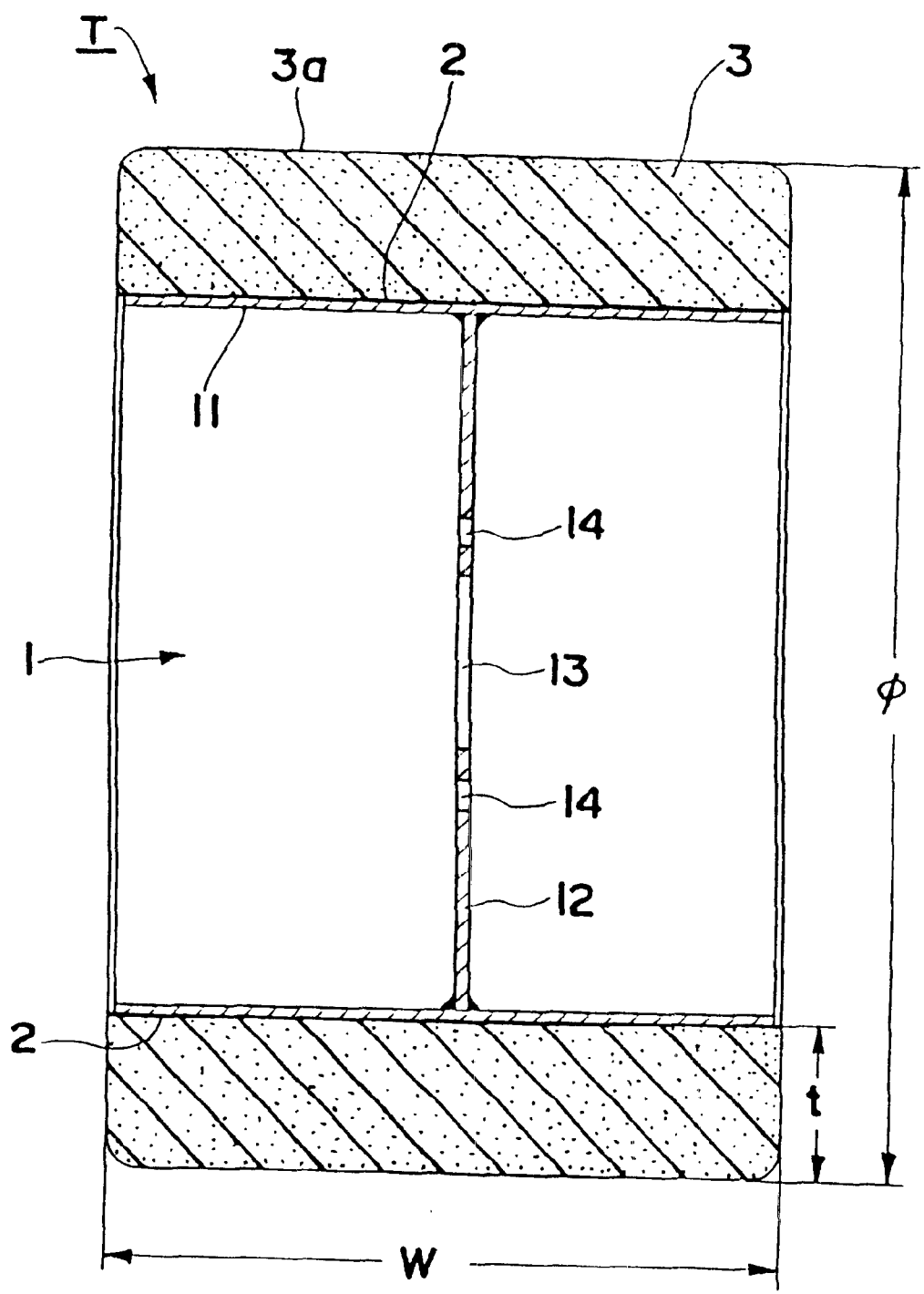
FIG. 1 is a cross-sectional view across the diameter of one embodiment of a soft tire according to the present invention.
Figure 2:
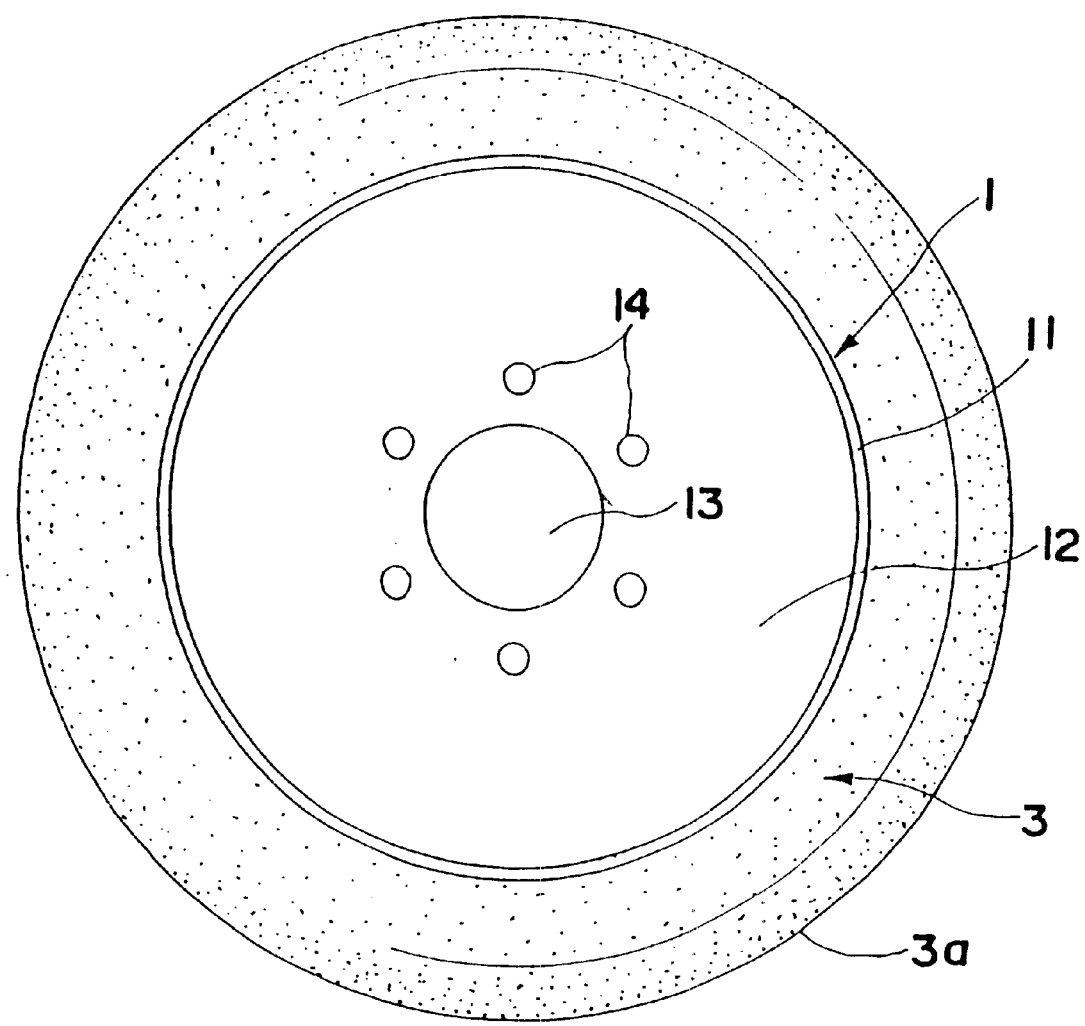
FIG. 2 is a side elevational view of the soft tire of FIG. 1.

A soft tire T, as shown in FIG. 1, is formed by attaching a thick elastic layer 3 of a foamed elastomeric body and having a substantially flat outer peripheral surface 3a onto the outer peripheral surface of a metallic wheel rim 1, such as formed from iron or the like.

The metallic wheel rim 1 of the tire T has a simple shape, in which a disc 12 for mounting on a wheel axle is welded onto the inside of a cylindrical body 11, and can be produced quite easily and at low cost. The wheel rim 1 is provided with a resin coat layer 2 on the outer peripheral surface of the cylindrical body 11. A wheel axle insertion hole 13 is formed at the center of the disc 12 and mounting bolt insertion holes 14 are formed at equal intervals around the wheel axle insertion hole 13.

The resin coat layer 2 on the outer peripheral surface of the cylindrical body 11 enhances bonding ability with the thick elastic layer 3. Particularly, when the elastic layer 3 is formed by mold casting and foaming which will be discussed later, the resin coat layer 2 can provide high bonding strength. In contrast to this, when the outer peripheral surface of the cylindrical body 11 is a metallic material, adhesion of the elastic layer 3 cannot be increased even by mold casting and foaming to prevent easy peeling off the interface by the load during travel.

The resin coat layer 2 can be formed for example by cationic electrodeposition. This is most suitable for greater adhesion with the thick elastic layer 3. As is well known, cationic electrodeposition involves dipping into a coating an object, with a water base paint and an emulsion paint, applying a direct current power by using the object to be coated as a cathode to obtain electrodeposition of the paint on the surface of the object. A material having high affinity to the elastomer of the thick elastic layer 3 can be selected as a resin component of the coating layer by cationic electrodeposition.

As the elastomeric foamed body of the thick elastic layer 3 is an open cell, or a mixture of open cells and isolated cells with a foaming ratio of from 1–5 to 6. It has been found that when the foaming ratio is less than 1.5, the elastic layer 3 becomes stiff to have a lower deformation ability and thus more easily to form ruts upon traveling on the soft ground surface. Conversely, as it was also found, when the foaming ratio is greater than 6, restoring ability from the deformed condition and sustaining power of the restoring force become insufficient to cause permanent deformation or failure to return from the compressed condition. Traveling resistance can be increased due to excessive deformation, and this degrades the traveling ability of the vehicle. When the foamed body has only isolated cells, no sufficient deforming ability can be obtained even when the foaming ratio falls within the foregoing range, and that makes it difficult to prevent rut formation.

The elastomer body suitably has a specific gravity of from 0.5 to 2.0. It was determined that if the specific gravity of the elastomeric foamed body is too small, excessive deformation results easily. On the other hand, when the specific gravity is excessively large, the deformation ability becomes insufficient and rut formation will occur on soft ground surfaces. An elastomer forming the foamed body can suitably be a polyurethane, ethylene propylene terpolymer (called as EPDM in ASTM standard D1418) or chloroprene rubber.

Dimensions of respective portions of the soft tire T suitably have an external diameter φ of the tire of from about 30 to about 60 cm, a width W of the tire of from about 20 to about 50 cm, and a thickness t of the thick elastic layer 3 of from about 5 to 10 cm. When the external diameter φ is too large, it is not suitable for the vehicles traveling on a sward surface. Conversely, if the external diameter φ of the tire is too small, tread width by deformation becomes too small and will more easily form the rut. On the other hand, when the tire width W is too large, mobility, such as changing direction, etc., can be degraded. Conversely, when the tire width W is too small, tread pressure can sufficiently increase more easily to cause a rut. Furthermore, when the thickness t of the thick elastic layer 3 is too large, deformability becomes excessive to degrade traveling ability of the vehicle. On the other hand, when the thickness t is too small, deformability becomes insufficient and more easily causes a rut.

Suitably the metallic wheel 2 is formed in a mold, with the resin coat layer 2 on its outer peripheral surface, an expandable elastomer composition is cast and foamed integrally to form the thick elastic layer 3 of the foamed elastomeric body on the outer peripheral surface of the wheel rim 1. In forming the thick elastic layer 3 by molding casting and foaming, it is particularly desirable that the resin coat layer 2 on the outer peripheral surface of the wheel rim 1 be a coat layer formed by cationic electrodeposition.

Next an example of forming the thick elastic layer 3 by molding casting and foaming is discussed. FIG. 3 shows a longitudinal section of a mold 4 for mold casting and foaming. The mold 4 has a bottom plate 41, a movable side frame 42a tiltably pivoted from the bottom plate by a pivot 5a, a stationary side frame 42b attached to the bottom plate, and a lid plate 43 openably pivoted by a pivot 5b. A vertical cylindrical cavity 40 is defined between the movable side frame 42a and the stationary side frame 42b mounted on the bottom plate 41. A handle 43a is provided on a lid plate 43.

Figure 5:
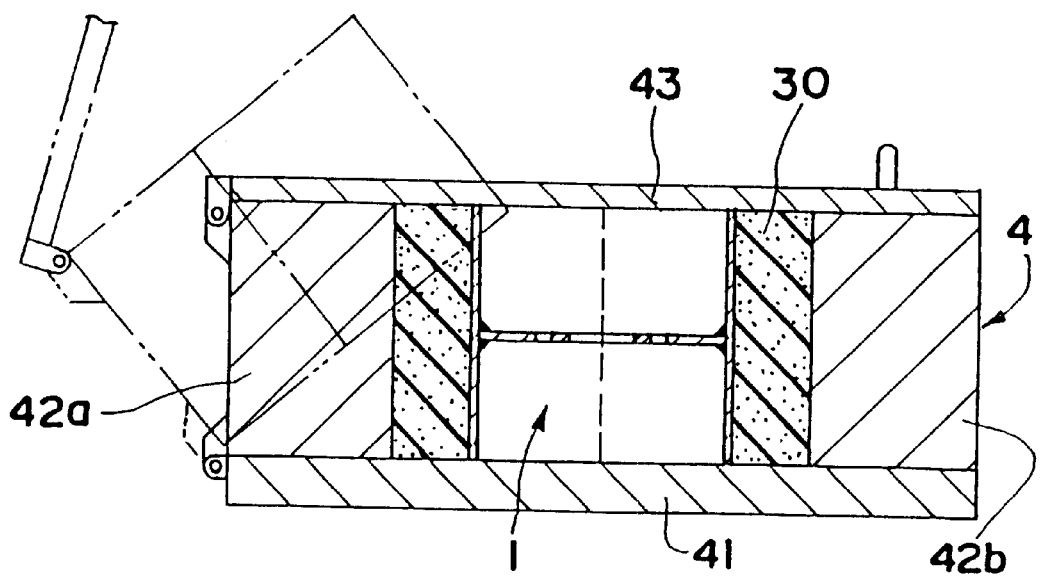
FIG. 5 is a longitudinal cross-sectional view as in FIG. 4, but showing a cast foamed molding.

In mold casting and foaming, a mold lubricant, such as dichrome methane, ethylene dioxide and the like, is applied over the entire inner surface of the cavity 40. Then, as shown in FIG. 4, the metallic wheel rim 1 formed with the resin coat layer 2 on its outer surface is inserted into the cavity 40 by positioning it at the center. The expandable elastomer composition is cast into an annular space 40a defined between the inner peripheral surface of the cavity and the outer peripheral surface of the wheel. After expansion by foaming, the expandable elastomer composition has open cells or a mixture of open and closed isolated cells. The respective components and their blending ratios have to be chosen so that the foaming ratio is from 1.5 to 6, and suitably the specific gravity of the foamed layer is from 0.5 to 2. Then, as shown in FIG. 5, the mold 4 is heated with the lid plate 43 closed, the composition is foamed. After completion of foaming, the lid plate 43 and the movable side frame 42a are opened to take out the wheel rim 1 with the foamed layer 30 attached to its outer periphery.

Figure 6:
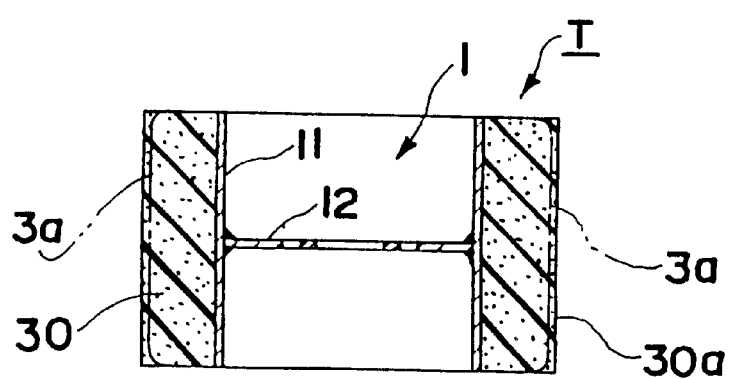
FIG. 6 is a longitudinal cross-sectional view showing the soft tire obtained by mold casting and foaming.

As shown in FIG. 6, the foamed layer 30 formed integrally on the outer periphery of the wheel rim 1 has a skin 30a on the surface. In a suitable construction, at least the skin layer 30a is removed from the outer peripheral portion of the tire as shown by broken lines in FIG. 6. By removal of the skin layer 30a, air permeability of the surface is improved and the surface becomes soft. Therefore, the soft tire T has appropriate deformation ability of the thick elastic layer 3 to avoid disturbance of plants on the soft ground surface, such as a sward.

Figure 7:
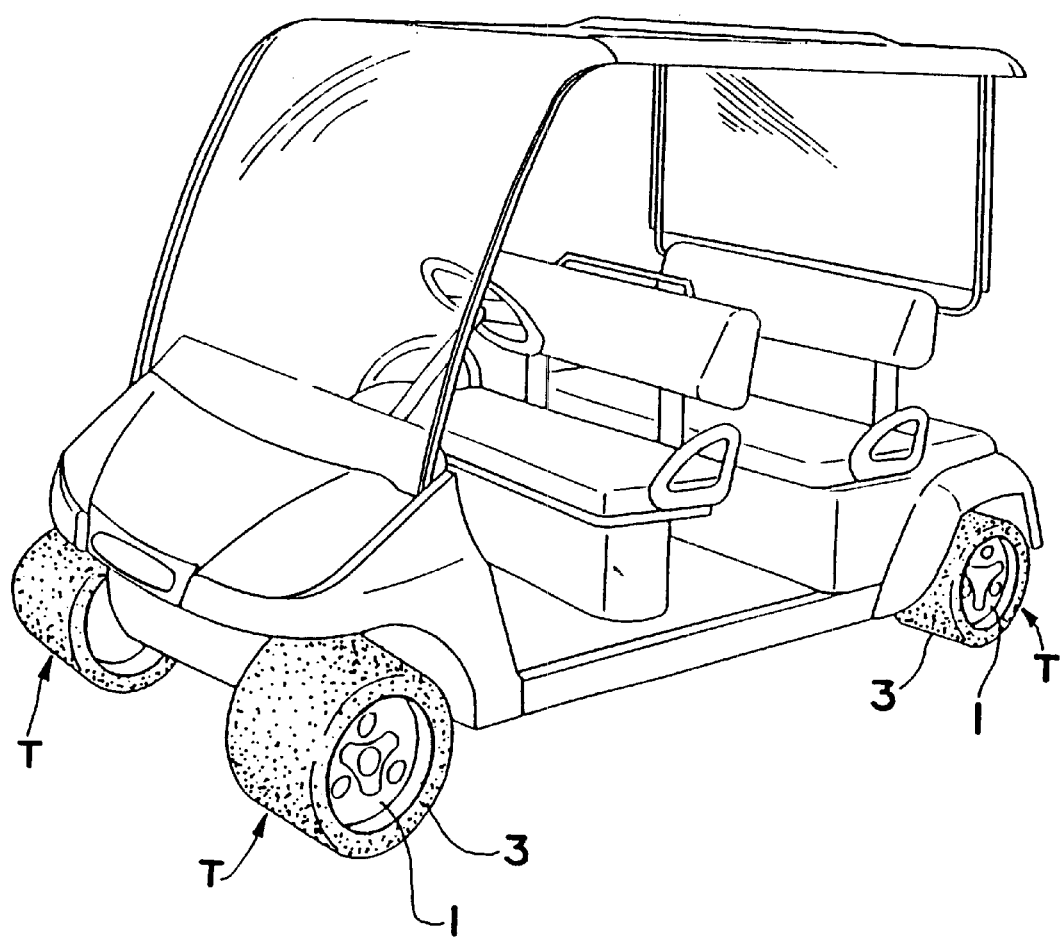
FIG. 7 is a perspective view of a golf cart, with attached soft tires in accordance with the present invention.

FIG. 7 shows one example of a four wheeled golf cart C, in which the soft tires of the present invention are mounted on both the front and the rear wheels. The golf cart C has soft tires on the front and rear wheels and does not form ruts even when it travels on sward surfaces. Therefore, it becomes unnecessary to provide a separate dedicated travel path as required in the prior art to transport golf players and caddies to the desired locations without entering onto the sward. Since the tire width is not too large, good mobility, such as for changing direction can be easily achieved. In view of the suitably long life of the tire the cost of maintenance is reduced. It should be noted that while the shown golf cart is four wheeled, it can also be a three wheeled cart.

It should be noted that, the self propelled vehicle employing the soft tires, is not limited to a golf cart, but can be any kind of a large variety of vehicles to be used in the golf course or elsewhere, such as the soil and sand fillers for filling soil and sand in the sward, lawn mowers, aerators, and engine powered vehicles for permitting e.g. physically disabled players to play golf while riding, vehicles for performing various research and observation by driving into marshes, grass lands and the like. These vehicles can be either three or four wheeled vehicles.

Since whether a rut is formed is significantly influenced by the vehicular weight including occupants' weight and weights of loaded articles in designing of the vehicle, the width and diameter of the soft tire T have to be selected depending upon the possible maximum deadweight of the vehicle. As an approximation to prevent formation of ruts, the tread pressure of the soft tire at the possible maximum weight load is suitably from 0.2 to 1.5 $kg/cm^2$.

A soft tire, according to the present invention has a thick elastic layer of flat outer peripheral surface, which thick elastic layer is formed of elastomer foamed body having foaming ratio of 1.5 to 6 of open cell or mixture of open and closed cells, the thick elastic layer being integrally attached onto an outer peripheral surface of a metallic wheel rim, onto which a resin coat layer is applied. When a vehicle, on which the soft tires are attached, travels on the soft ground, such as a sward, the thick elastic layer causes appropriate elastic deformation to widen the tread width to lower tread pressure so that no rut is formed. The ability of the elastic layer to become restored from its deformed condition can be satisfactorily maintained for long periods. Since bonding strength between the outer peripheral portion and the elastic layer is large, quite superior durability can be achieved. For great bonding strength, the outer peripheral portion can be formed into a simple shape, such as a cylindrical shape. Since an integral wide tire can be built, the soft tire can be easily formed and at low cost. With the soft tire of the present invention, a vehicle with high mobility can be obtained.

By setting the specific weight of the foamed elastomeric body of from 0.5 to 2.0, rut formation can be provided and durability of the soft tire can be further increased.

By forming the coat by cationic electrodeposition, durability of the soft tire can be further enhanced.

By forming metallic wheel rim with a flat cylindrical surface, manufacturing of the soft tire can be facilitated and production cost can be reduced.

Most suitably the dimensions of the soft tire for the vehicle, such as the golf cart, have an external diameter of from 30 to 60 cm, a tire width of from 20 to 50 cm, and an elastic layer thickness of from 5 to 10 cm. With such preferred that kind of dimensioning of the soft tires, three or four wheeled vehicles can be obtained which can travel on soft ground, such as sward with high mobility.

A soft tire according to the present invention has superior durability.

By removing a thin skin layer from at least the outer peripheral portion of the elastomeric foamed layer formed by mold casting and foaming, the deformation ability of the deformation layer is properly established to avoid disturbance of plant life in the soft ground surface, such as a sward.

By employing soft tire of the present invention in each wheels of a self propelled vehicle, the vehicle can travel on the soft ground, such as a sward without forming ruts. Since the soft tire of the present invention has high durability, its maintenance costs can be reduced such as by avoiding frequent tire changes.

The three or four wheeled golf cart using the soft tire can ride into a sward without forming a rut.

Since the tread pressure of the soft tire is within a desired range, ruts can be certainly prevented when traveling on soft ground, such as a sward.

What is claimed is:

1. A process for making the soft tire assembly which comprises:
   (i) depositing a coating resin over the outer surface of a wheel rim,
   (ii) inserting the coated wheel rim having an outer peripheral surface into a casting and foaming mold having an inner peripheral surface,
   (iii) filling and foaming an expandable elastomer in a space within said mold between said inner peripheral surface and said outer peripheral surface to form a thick elastic layer of foamed elastomer integrally with said wheel rim, said thick elastic layer having a substantially flat outer peripheral surface and an expansion ratio of from 1.5 to 6, and
   (iv) removing an outer skin formed on at least said flat outer peripheral surface whereby foamed cells within said thick foamed elastic layer become exposed to the exterior through said substantially flat outer peripheral surface.

* * * * *